March 3, 1931. W. H. BENEDICT 1,794,825
SPRING BALANCING DEVICE
Filed Dec. 17, 1925 2 Sheets-Sheet 1
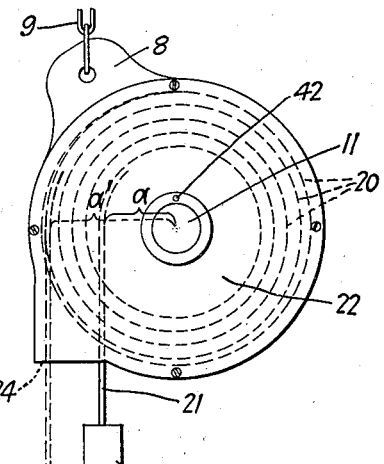
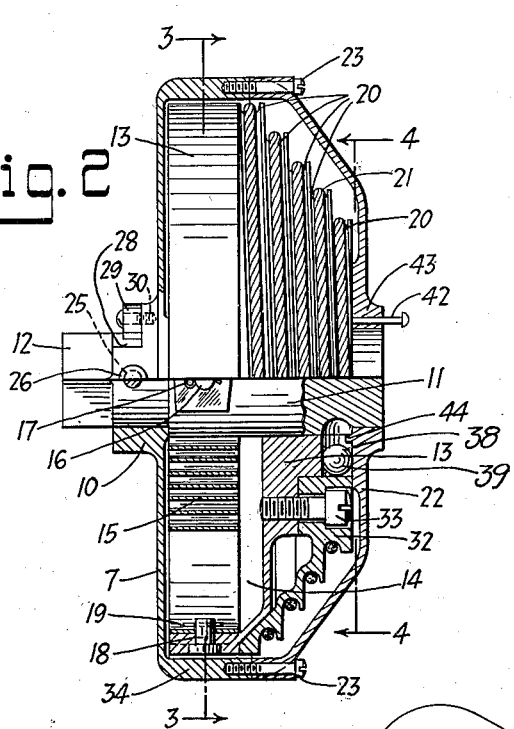
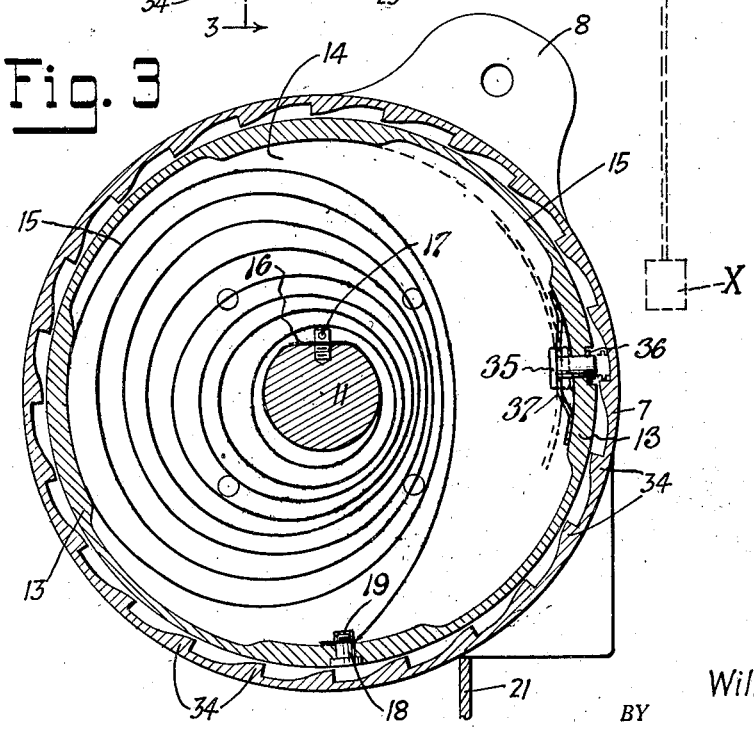
INVENTOR.
William H. Benedict
BY Ira L. Nickerson
his ATTORNEY.

March 3, 1931.   W. H. BENEDICT   1,794,825
SPRING BALANCING DEVICE
Filed Dec. 17, 1925   2 Sheets-Sheet 2
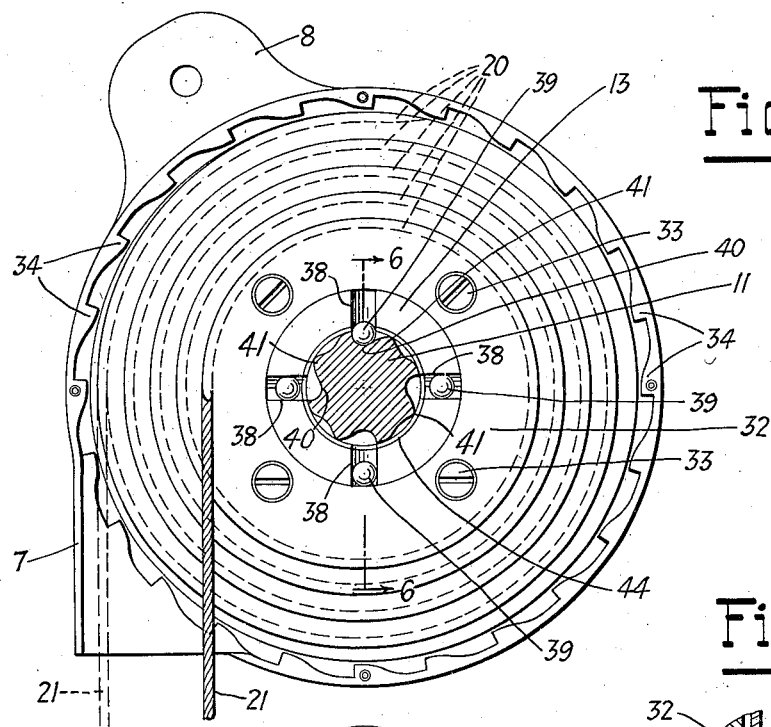
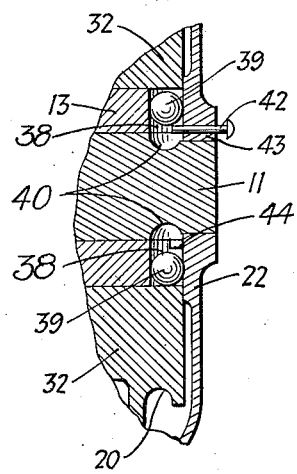
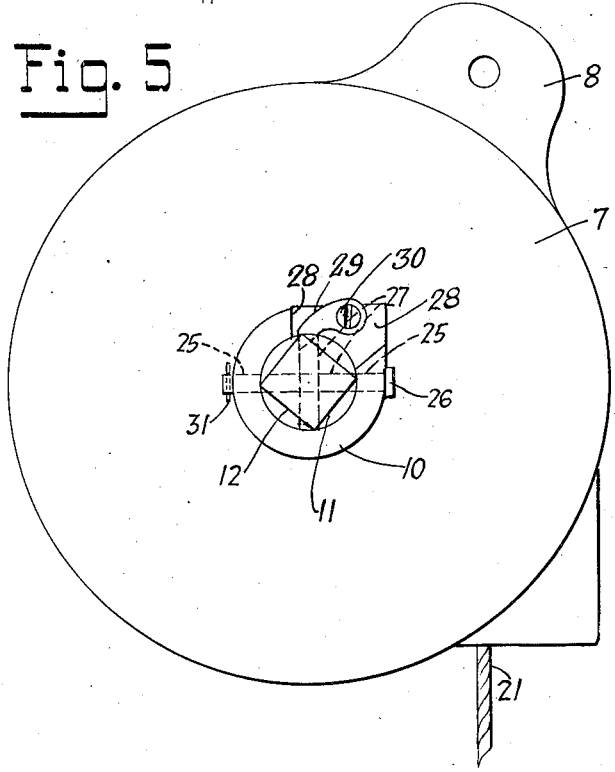
INVENTOR.
William H. Benedict
BY
Ira L. Nickerson
his ATTORNEY.

Patented Mar. 3, 1931

1,794,825

UNITED STATES PATENT OFFICE

WILLIAM H. BENEDICT, OF SOUND BEACH, CONNECTICUT, ASSIGNOR TO CHICAGO PNEUMATIC TOOL COMPANY, OF NEW YORK, N. Y., A CORPORATION OF NEW JERSEY

SPRING BALANCING DEVICE

Application filed December 17, 1925. Serial No. 75,922.

This invention relates to devices for supporting weights or weighty objects at any desired height and more particularly to counter-balancing devices in which adjustable tensioning means such as springs are utilized to balance and to overcome the force of gravity. Devices of this kind are extensively used instead of counter-weights for supporting portable power tools and other objects.

The compactness, portability, and adaptability of the spring balancing device make the latter very attractive and desirable as compared with the counter-balancing weight with its pulleys and relatively fixed position. In respect to the range of movement of the object while maintained in balance spring devices as heretofore constructed have fallen far short of the counter weight system. This has been due to the problem presented by the increased tensioning or winding up of the spring when the weight is lowered and by the decreased tensioning or unwinding of the spring when the weight is raised. In a device in which the spring is free to act the weight can be moved only slightly above and below the point of balance and still remain in balance. This range which is ordinarily of a few inches only is due to inertia and to friction between the moving parts of the device. Heretofore it has been proposed to increase the range of balance by cramping the spring, by varying the point of attachment of its free end so as to reduce its leverage, or otherwise to interfere with its free operation. By such expedients the range of balanced movement of the weight in a device of a given size can be increased a hundred percent or more but the range is still short and the application of considerable force which must be steadily increased is required to pull the weight down. Moreover the balancing is erratic and faulty as the limits of the specified range are approached.

Among the objects of the invention are to increase the balancing range of devices of the type described, to provide for accurate balancing throughout such range, to increase the weight which can be balanced by a given spring, to prevent falling of the weight in the event of breaking of the spring, to provide improved means for locking or releasing the drum at will, to effect economies in the manufacture and assembly of such devices, to increase the accessibility of the parts and to diminish the time required for repairs and adjustments, and in general to simplify and to improve prior devices in the interests of more satisfactory and more efficient service.

The invention arranges to compensate for the variations in the tension of the spring in order that accurate balancing of the weight may be effected over any desired range of movement. Since the weight itself cannot be changed, the compensation is accomplished by suitably varying the effect of the weight, as by varying the leverage exerted by the weight. The invention further provides for increasing the weight range of the device by using interchangeable members for varying the leverage of the weight. These members are arranged to be interchanged with a minimum of effort and without taking the device entirely apart. The invention further provides a stop or lock which operates instantly and positively on release or breaking of the spring, thereby preventing injury and damage from a falling weight. Suitable means are also provided for stopping the winding of the reel by the spring in any desired position, such means being automatic in operation and easily controlled by the operator. These means are arranged easily to be rendered inoperative if desired. The invention still further provides a simplified design and assembly of the parts which effect economies in manufacture and assembly and which render the same very accessible for adjustments and repairs.

In order to illustrate the invention one concrete embodiment thereof is shown in the accompanying drawings, in which:

Fig. 1 is a front elevational view somewhat diagrammatic to illustrate the operation of the invention;

Fig. 2 is a transverse sectional view of the device, the casing only being sectional in the upper half thereof;

Fig. 3 is a sectional view substantially on the line 3—3 of Fig. 2;

Fig. 4 is a front elevational view with the cover plate removed and showing the shaft in section substantially on the line 4—4 of Fig. 2;

Fig. 5 is an elevational view of the opposite side of the device to that shown in Fig. 1; and Fig. 6 is a detail sectional view substantially on the line 6—6 of Fig. 4.

In the embodiment of the invention chosen for the purpose of illustration the balancing device has a casing 7 providing an apertured integral portion 8 for the attachment of a supporting cable or chain 9. Casing 7 is provided on its rear face with a boss 10 forming a bearing of substantial size for a shaft 11 which may have a squared head 12 for a purpose presently to be described. Within casing 7 and rotatably mounted on shaft 11 is a member or drum 13 formed with a chamber 14 concentric with the shaft in which chamber is disposed a volute spring 15 having its inner end fixedly secured to shaft 11 in any suitable manner, as by providing an aperture in the spring and passing it over the head of a stud 16 and retaining the spring on the stud as by a pin 17. The outer end of the spring is secured to the peripheral portion of the drum 13 as by a stud 18 inserted through an opening therefor in the drum, the apertured end of the spring being passed over the inwardly projecting portion of the stud and being retained thereon as by cotter pin 19. Thus the spring when placed under tension tends to rotate the drum in a counter-clockwise direction as shown in Fig. 3 and in a clockwise direction as shown in Fig. 5.

The drum 13 extends beyond, or to the right of casing 7, as indicated in Fig. 2, and is provided with a continuous guide groove 20 which is substantially in the form of a spiral so that this portion of the drum resembles a truncated cone. A flexible connection, such as a rope or wire cable 21, is secured to the drum and coiled on the latter in the guide groove 20, extending from the outermost or smallest diameter convolution of the groove to the exterior of the device. To the end of cable 21 is secured any weight or weighted object X such as a portable tool or machine which it is desired to support. The projecting portion of the drum 13 is enclosed by a cover plate 22 secured to the casing by suitable means such as cap screws 23 and the cover plate is arranged to provide a bearing for the projecting end of shaft 11. Cover 22 also has an opening or slot 24 extending from the inner face thereof and of suitable extent and dimensions to permit free movement of cable 21 as it unwinds from, or winds into the spiral guide groove 20.

In order that spring 15 may be suitably tensioned to balance objects of differing weight, the shaft 11 to which the inner end of the spring is secured is provided with the squared end 12 for the application of a wrench or crank and is arranged securely to be held in adjusted position. To this end boss 10 has a cross bore 25 for a locking pin 26 which extends through one of a series of bores 27 in shaft 11 arranged to register therewith. In order that the adjustment of shaft 11 may be made with safety and with ease a portion of the boss 10 is cut away at 28 and a pawl 29 is therein mounted on a stud 30, the end of pawl 29 being arranged to extend within the openings formed by the cross bores 27 to hold the shaft against movement while the locking pin 26 is being inserted or removed and as desired during the adjusting of shaft 11. A cotter pin 31 holds pin 26 against accidental removal.

The operation of the balancing device, as so far described, and the importance of the spiral guide 20 for the cable 21 in effecting accurate balancing of the weight X in a desired range of movement of the latter will be apparent from the diagrammatic showing of Fig. 1. Since one end of spring 15 is fast to the fixed shaft 11 and since the drum 13 is rotated as the weight X is raised or lowered, it is apparent that the tension of spring 15 will be increased as the weight is lowered and its tension decreased as the weight is raised. These variations in spring tension are offset by changing the leverage of the weight X or the force exerted by it to rotate the drum which is accomplished by the variations in the point of contact of the cable 21 with its sheave relative to the axis of the drum, which variations are produced by groove 20. By properly proportioning the spiral guide groove 20 the device may be made to balance a given weight through any range of movement of the same within the limits fixed by the length of the spring. By referring to Fig. 1 it will be evident that when the weight X is in its uppermost or full line position, its leverage as indicated by the bracket $a$ is least. As the weight is lowered and the tension of the spring is increased the winding convolutions of the guide groove increase the leverage exerted by the weight in corresponding degree, the maximum leverage being indicated by the bracket $a'$. Thus with the spring 15 adjusted to balance the weight X at either extremity of its movement a guide groove such as 20 of the proper pitch will insure the accurate balancing of the weight throughout its entire range of movement.

Since the construction above described permits a given spring to balance a maximum range of weights and since one pitch of spiral groove will not accurately meet balancing conditions for weights which vary too widely, provision is made for the convenient substitution or interchange of guide members for the cable. To this end that portion of the drum which carries the groove 20 is made in the form of a detachable sheave 32 (Fig. 2) arranged to have telescoping engagement with certain portions of the extension of drum member 13 and secured to the latter by a series of cap screws 33. The construction of the balancing device is such as to permit the interchange of sheaves 32 with the greatest ease. It is only necessary to remove the cover plate 22 and to take out the cap screws 33 whereupon the sheave 32 with its cable thereon may be slipped off of the extension of drum 13 and another sheave placed thereon. If the cable is attached to drum 13 and not to the sheave 32 it is only necessary to slip the cable off the sheave before its removal and to rewind it on the new sheave after the latter has been mounted.

It is obvious that the leverage varying guide arrangement disclosed is capable of uses other than those relating merely to the balancing of the weight, and is adaptable to combinations to meet special conditions in which overbalancing or underbalancing of the weight is desired. For example, by properly designing and proportioning the guide sheave the weight may be maintained in a state of balance during a specified range of movement and then automatically raised or lowered by the spring when a certain point is reached. Other combinations and arrangements will readily suggest themselves to one skilled in the art.

In a balancing device in which the weight is supported by a spring, sudden release or breakage of the spring from any cause will permit the weight to drop and possibly injure persons or damage property. The present invention provides means for preventing such accidents which means are arranged to be positively operated by the broken or released spring itself. Such means may take the form of a plunger carried by the drum and arranged to be projected into locking engagement with the stationary casing in which the drum is mounted. To this end casing 7 is provided with a series of projections or teeth 34 (Figs. 3 and 4). Stud 18 to which the outer end of spring 15 is secured may serve as such a plunger and it will be obvious that upon breaking or releasing of spring 15 the same will expand to fill chamber 14 and force stud 18 into engagement with teeth 34 so as to lock the drum 13 to the casing and prevent the dropping of the weight X. As stud 18 serves to anchor the spring to the drum there is a possibility that it may become wedged in its opening and prevented from movement to locking position by reason of the constant pressure of the spring thereon. For this reason an additional plunger 35 is provided inserted from the interior of the drum and so disposed as not to be engaged by spring 15 when the same is in normal operation (see Fig. 3). The outer end of plunger 13 is provided with suitable stop means such as a cross pin or cotter 36 and the plunger is normally retained in inwardly projecting or inoperative position by a light spring 37 which may take the form of a bent strip of spring material with an aperture through which the stem of the plunger passes. On breaking or release of spring 15 the powerful pressure of the same upon the head of plunger 35 will easily overcome the light spring 37 and the plunger will be forced to locking or operative position indicated by dotted outline of the same in Fig. 3.

In certain kinds of work it is desirable to suspend the winding action of spring 15 and to lock the drum in a desired position so as to permit the weight to be handled freely. Preferred means for this purpose are illustrated in Figs. 2, 4 and 6. The outer or right hand end (Figs. 2 and 6) of the drum extension 13 is formed with radial bores or grooves 38 in each of which is disposed a suitable gravity operated member such as a ball 39. When any of the bores 38 is vertically disposed above shaft 11 the ball 39 will fall by gravity into a recess such as 40 in the shaft thereby locking the drum against movement in the direction in which it is urged by spring 15. Shaft 11 has as many sockets or recesses 40 as it has positions of adjustment during a single revolution,—in the present instance 4. In order that the locking member 39 may be dislodged from locking position, shaft 11 has a bump or projection 41 following each recess 40 so that on pulling the weight downwardly to a slight extent and then lifting the same so that the spring is free to rotate the drum the projection 41 throws the gravity stop 39 out of the locking recess 40 and the stop is kept out of the locking recesses while the drum rotates by the action of the projections 41 and by centrifugal force. To lock the drum in place it is merely necessary to let the drum rotate slowly or to stop it long enough for a gravity stop 39 which may be directly above shaft 31 to drop into place. In case it is not desired to use the gravity stop arrangement just described, the balls 39 may be left out or easily removed by simply taking off the cover plate 22. If, however, the suspension of such means is merely temporary a small plunger such as a pin 42 or a bit of wire may be inserted in an opening 43 therefor in cover plate 22 (Fig. 6) directly above the axis of shaft 11. The end of the plunger or pin 42 projects within a groove 44 in the outer or right hand end of drum 13 adjacent shaft 11 (Figs. 2, 4, and 6). The pin may be forced into operative position while none of balls 39 is vertically disposed above shaft 11 and once the pin is inserted the balls will ride over the end of pin 42 and be prevented from dropping into the locking recess 40.

From the above it will be apparent that the range, scope, adaptability and performance of a spring balancing device is increased and improved by providing properly proportioned and designed means for varying the leverage of the weight, particularly when interchangeable sheaves for this purpose are employed, that simple and positively operating means are provided for preventing dropping of the weight in the event of release or breaking of the spring, that gravity stop mechanism which may be rendered inoperative at will may be utilized temporarily to suspend the action of the spring, that the construction disclosed permits convenient access to the operative parts of the device for adjustment and repairs, that the device contains but few parts which are inexpensive to manufacture and to assemble, and that the device is rugged, substantial, efficient and practically fool-proof.

While what is now considered to be the preferred form of the invention has been herein shown and described, it is to be understood that the invention is not limited to the specific details thereof but covers all changes, modifications and adaptations coming within the scope of the appended claims.

I claim as my invention:

1. A weight balancing device comprising a rotatable member, a spring for rotating said member in one direction, means for adjusting the tension of said spring, a flexible connection extending from said member for supporting a weight, said rotatable member including means compensating for the variations in the tension of said spring as the weight is raised or lowered, and means enclosing said parts and maintaining the same in assembled relation, said last named means permitting convenient access to said flexible member and to said compensating means without disturbing the assembly of the remaining parts.

2. A weight balancing device comprising a rotatable member, a shaft upon which said member is rotatably mounted, a spring secured at one end of said shaft and at the other to said member for rotating the latter in one direction, a flexible connection extending from said member for supporting a weight, said rotatable member including means compensating for the variations in the tension of said spring as the weight is raised or lowered, and means enclosing said parts and maintaining the same in assembled relation permitting convenient access to said flexible member and to said compensating means without disturbing the assembly of the remaining parts.

3. A weight balancing device comprising a drum, a spring arranged to rotate said drum in one direction, means for adjusting the tension of said spring, a flexible member for supporting a weight, and a sheave for said member detachably secured to said drum having means for varying the force exerted by the weight as said member is wound upon or unwound from said sheave and a supporting enclosure for said parts having means permitting convenient access to said sheave and flexible member without disturbing the assembly of said device or the tension of said spring.

4. A weight balancing device comprising a rotatable member, a spring for rotating said member in one direction, a flexible connection for supporting a weight, said rotatable member having means receiving said flexible connection and to which the latter is secured for compensating for variations in the tension of the spring caused by lowering or raising the weight, and means providing for removal and replacement of said compensating means without disturbing the assembly of said spring and of said rotatable member.

5. A weight balancing device comprising a drum, a spring arranged to rotate said drum in one direction, a flexible member for supporting a weight, a guide sheave for said member detachably secured to said drum and having means for varying the force exerted by the weight, and a casing rotatably supporting said drum and enclosing said other parts, said casing having a closure permitting direct access to said sheave for the removal of the same and substitution of another sheave without disturbing said drum and spring assembly thereby to adapt the same spring motor for the balancing of widely varying weights.

6. A weight balancing device comprising a casing having a shaft mounted therein, a drum rotatably mounted on said shaft, a spring within said drum having one end secured to said shaft and the other to said drum, a sheave detachably secured to said drum and projecting beyond said casing, a flexible member wound on said sheave for supporting a weight, a cover enclosing said sheave and secured to said casing and having a slot to receive said member, and means providing for removal of said cover and convenient interchange of sheaves without disturbing the assembly of the remaining parts in said casing.

7. A weight balancing device comprising a casing having a shaft mounted therein, a drum rotatably mounted on said shaft, a spring within said drum having one end secured to said shaft and the other to said drum, a sheave telescoped over said shaft and detachably secured to said drum, said sheave projecting beyond said casing, a flexible member wound on said sheave for supporting a weight, and a cover enclosing said sheave and secured to said casing, said cover having a slot for said member and providing a bearing for said shaft.

8. A weight balancing device comprising a casing have a shaft mounted therein, a drum rotatably mounted on said shaft, a spring within said drum having one end secured to said shaft and the other to said drum, an interchangeable sheave detachably secured to said drum and having a spiral guide groove upon the exterior thereof, a flexible member arranged to be guided by said groove for supporting a weight, said sheave projecting beyond said casing, and a cover for said casing secured to the latter and enclosing said sheave and providing an opening for said member.

9. In a spring motor device, a rotatable drum, a spring therewithin for rotating said member, and means operable as a result of the expansive action of the spring on release or breaking of the same for locking said drum against rotative movement.

10. In a weight balancing device, a rotatable drum, a flexible member wound on said drum for supporting a weight, a spring confined within a portion of the interior of said drum, and means operated by the releasing of said spring for locking said drum against rotative movement.

11. In a spring motor device, a rotatable drum, a spring therewithin for rotating said member, and means including a member arranged to be engaged by the spring on release or breakage of the same and to move to operative position to lock the drum against movement.

12. The combination of a casing having a drum rotatable therein, a spring arranged to rotate said drum in one direction and to resist its rotation in the other, and means on said drum operated by said spring on release or breakage of the same for engagement with said casing to lock the drum against rotation.

13. The combination of a casing having a drum rotatable therein, a spring arranged to rotate said drum in one direction and to resist its rotation in the other, and a plunger carried by said drum and arranged to be forced outwardly on breakage of the spring to engage the casing and lock the drum against movement.

14. The combination of a casing having a drum rotatable therein, a spring arranged to rotate said drum in one direction and to resist its rotation in the other, and a stop carried by said drum, means normally maintaining said stop in inoperative position, said stop being arranged to be actuated by said spring on breakage of the latter into engagement with the casing to lock the drum against movement.

15. The combination of a casing having a drum rotatable therein, a spring arranged to rotate said drum in one direction and to resist its rotation in the other, a stop plunger carried by said drum, and a light spring member normally maintaining said plunger in inoperative position, said plunger being so disposed as to be engaged by said first named spring on release or breakage of the same and to be forced against the resistance of said spring member into engagement with said casing to lock the drum against movement.

16. The combination of a casing having a drum rotatable therein, a spring arranged to rotate said drum in one direction and to resist its rotation in the other, a plunger mounted in a bore in a peripheral portion of said drum, a light spring member normally maintaining said plunger projecting within said drum, said plunger being so arranged as to be forced outwardly by said first named spring on release or breakage of the latter, and means on said casing to be engaged by said plunger so as to lock the drum against movement.

17. The combination of a casing having a drum rotatable therein, a spring arranged to rotate said drum in one direction and to resist its rotation in the other, a plunger mounted in a radial bore in a peripheral portion of said drum, means maintaining said plunger within said bore and yieldingly holding the plunger normally projecting within said drum in position to be struck and forced outwardly by said spring in the event of release or breakage of the same, and a series of projections on said casing arranged to be engaged by said plunger so as to lock the drum against movement.

18. In a spring motor device, a drum, a spring for rotating said drum, a casing inclosing said drum, and means for preventing rotation of said drum including a member carried by said drum and arranged to be projected therefrom into engagement with said casing.

19. In a spring motor device, a drum, a spring for rotating said drum, a casing inclosing said drum, and means for preventing rotation of said drum including a member carried by said drum and arranged to be projected therefrom into engagement with said casing, said member being operated by said spring on release or breaking of the same.

20. In a spring motor device, a drum, a spring for rotating said drum, a casing inclosing said drum and providing a stop, and means arranged to be forced into engagement with said stop to prevent rotation of said drum, said means being operated by said spring on release or breaking of the same.

21. In a weight balancing device, a rotatable drum, a flexible member wound on said drum for supporting a weight, a spring confined within said drum, a casing inclosing said drum and providing a series of stops on its inner face, and a member carried by said drum and arranged to be projected outwardly into engagement with said stops to lock the drum against movement as a result of the expansive action of said spring on release or breaking of the same.

22. A weight balancing device comprising a rotatable member, a spring for rotating said member in one direction, a flexible connection from said member for supporting a weight, means compensating for the variations in the tension of said spring as the weight is lowered or raised, and means operable on release or breaking of said spring for locking said member against movement.

23. A weight balancing device comprising a rotatable member, a spring for rotating said member in one direction, a flexible connection from said member for supporting a weight, means for varying the leverage of said weight on said member to compensate for the changes in the tension of the spring produced by raising and lowering the weight, and means actuated by said spring on release or breakage of the same for locking said member against movement.

24. A weight balancing device comprising a casing having a shaft adjustably mounted therein, a drum rotatable on said shaft, a volute spring within said drum having its outer end secured to the latter and its inner end secured to said shaft, gravity operated stop members in radial bores in the outer end of said drum, a removable sheave telescoping over the end of the drum and forming an end wall for said bores, and a cover for said casing fitting close against the outer end of said drum and retaining said stop members in said bores.

25. A reeling device having a shaft, a drum rotatably mounted on said shaft, cooperating means on said shaft and drum for interfering with the rotation of said drum including a gravity operated member on said drum, and means operable at will for preventing movement of said member to drum locking position.

26. A reeling device having a shaft, a drum rotatably mounted on said shaft, cooperating means on said shaft and drum for interfering with the rotation of said drum including a gravity operated member on said drum, said drum having an annular recess intersecting the path of movement of said member, and a stop pin mounted on said casing and arranged to be projected into said recess at will to prevent movement of said member to drum locking position.

27. A weight balancing device having a stationary shaft, a drum rotatably mounted therein, a spring arranged to rotate said drum in one direction, a flexible connection for a weight wound upon said drum, a gravity actuated member mounted in a radial bore in said drum and arranged to engage a recess in said shaft to prevent rotation of said drum under the action of said spring, and means for interfering with the operation of said member.

28. A weight balancing device having a stationary shaft, a drum rotatably mounted on said shaft, a spring arranged to rotate said drum in one direction, a flexible connection for a weight wound upon said drum, a gravity actuated member mounted in a radial bore in said drum and arranged to engage a recess in said shaft to prevent rotation of said drum under the action of said spring, and a member arranged to be projected at will into the path of movement of said gravity actuated member to prevent operation of the same.

29. A spring balancing device comprising a casing, a shaft adjustably mounted therein, a drum rotatable on said shaft, a volute spring surrounding said shaft within said drum having its ends secured to said drum and said shaft respectively, an interchangeable sheave mounted on said drum, a flexible member wound on said sheave for supporting a weight, a cover enclosing said sheave and secured to said casing, said cover providing a bearing for said shaft and a slot for said member, and means responsive to release or breaking of said spring for locking said drum to said casing.

30. A spring balancing device comprising a casing, a shaft adjustably mounted therein, a drum rotatable on said shaft, a volute spring surrounding said shaft within said drum having its ends secured to said drum and said shaft respectively, an interchangeable sheave mounted on said drum, a flexible member wound on said sheave for supporting a weight, a cover enclosing said sheave and secured to said casing, said cover providing a bearing for said shaft and a slot for said member, and means including a gravity actuated member retained in place by said cover for releasably effecting a stop connection between said drum and said shaft at will.

31. A spring balancing device comprising a casing, a shaft adjustably mounted therein, a drum rotatable on said shaft, a volute spring surrounding said shaft within said drum having its ends secured to said drum and said shaft respectively, an interchangeable sheave mounted on said drum, a flexible member wound on said sheave for supporting a weight, a cover enclosing said sheave and secured to said casing, said cover providing a bearing for said shaft and a slot for said member, means responsive to release or breaking of said spring for locking said drum to said casing, and means including a gravity actuated member retained in place by said cover for releasably effecting a stop connection between said drum and shaft at will.

32. A spring balancing device comprising a casing, a shaft adjustably mounted therein, a drum rotatable on said shaft, a volute spring surrounding said shaft within said drum having its ends secured to said drum and said shaft respectively, an interchangeable sheave mounted on said drum, a flexible member wound on said sheave for supporting a weight, a cover enclosing said sheave and secured to said casing, said cover providing a bearing for said shaft and a slot for said member, means including a gravity actuated member retained in place by said cover for releasably effecting a stop connection between said drum and shaft at will, and means for rendering said last named means inoperative.

33. A spring balancing device comprising a casing, a shaft adjustably mounted therein, a drum rotatable on said shaft, a volute spring surrounding said shaft within said drum having its ends secured to said drum and said shaft respectively, an interchangeable sheave mounted on said drum, a flexible member wound on said sheave for supporting a weight, a cover enclosing said sheave and secured to said casing, said cover providing a bearing for said shaft and a slot for said member, means including a gravity actuated member retained in place by said cover for releasably effecting a stop connection between said drum and shaft at will, and a manually operable stop member on said cover for preventing operation of said gravity actuated member.

34. A weight balancing device comprising a casing having an apertured boss, a shaft supported in said aperture, a cross bore in said boss, bores in said shaft in the plane of said cross bore, a pin arranged to pass through said cross bore and one of the bores in said shaft to lock the shaft in one position, and means for fixing the position of said shaft while said pin is being inserted or removed.

35. A weight balancing device comprising a casing having an apertured boss, a shaft supported in said aperture, a cross bore in said boss, bores in said shaft in the plane of said cross bore, a pin arranged to pass through said cross bore and one of the bores in said shaft to lock the shaft in one position, said boss being cut away at one point and a pawl mounted in said cut away portion of said boss and arranged to enter another of said shaft bores.

Signed by me at New York city this 14th day of Dec., 1925.

WM. H. BENEDICT.